UNITED STATES PATENT OFFICE.

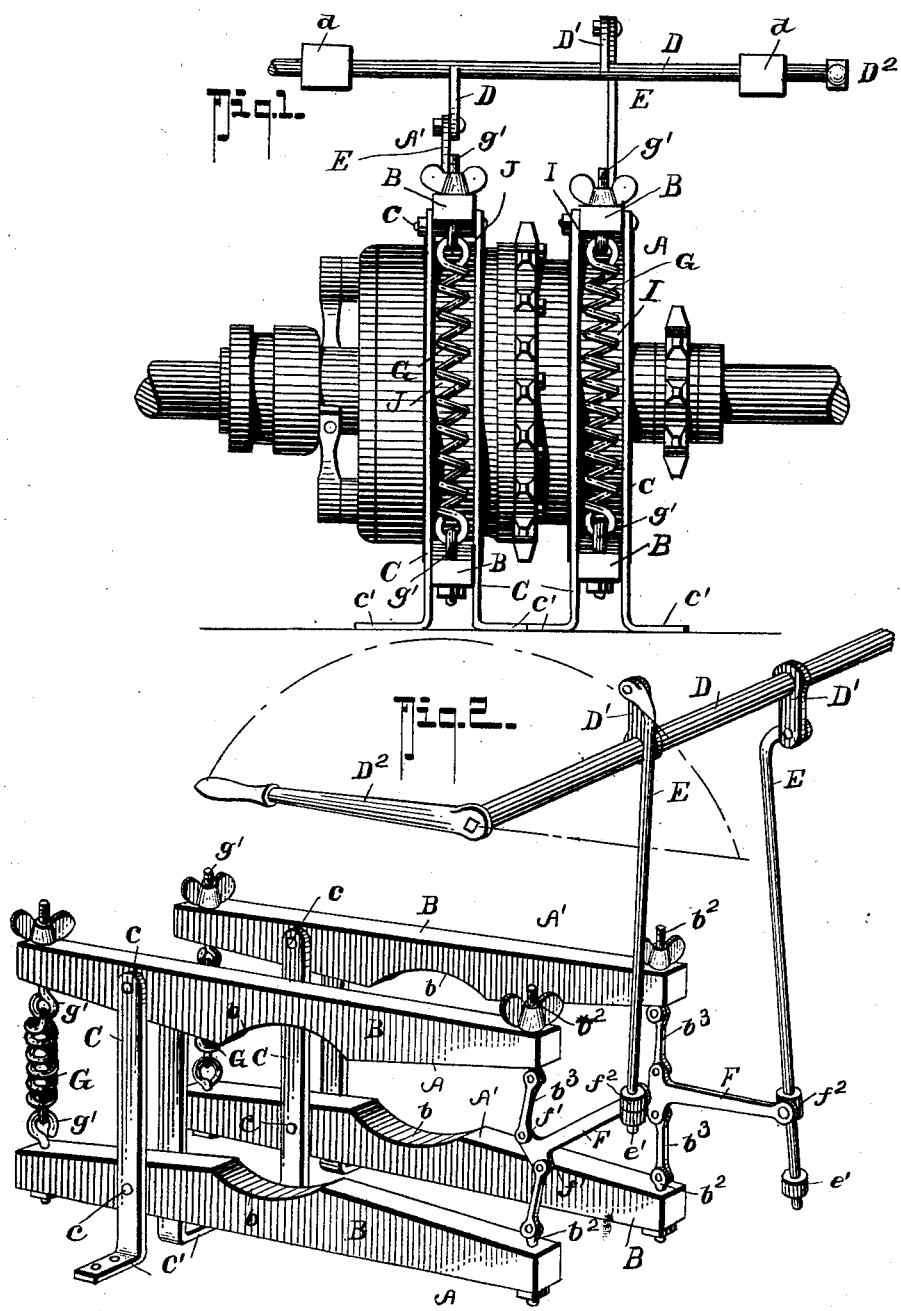

RALPH BENTON HAIN, OF LOS ANGELES, CALIFORNIA, ASSIGNOR TO AUTO VEHICLE COMPANY, OF LOS ANGELES, CALIFORNIA, A CORPORATION OF CALIFORNIA.

BRAKE MECHANISM.

SPECIFICATION forming part of Letters Patent No. 715,060, dated December 2, 1902.

Application filed July 30, 1902. Serial No. 117,650. (No model.)

*To all whom it may concern:*

Be it known that I, RALPH BENTON HAIN, residing at Los Angeles, in the county of Los Angeles and State of California, have invented certain new and useful Improvements in Brake Mechanisms, of which the following is a specification.

My invention is in the nature of an improved brake mechanism especially adapted for use in connection with transmission-gear devices in which a plurality of brake-drums are included, and it is especially adapted for use in connection with the form of transmission-gear devices disclosed in my copending application, Serial No. 117,650, filed on even date with this application.

My invention comprises a plurality of independently-operatable clamping or brake jaws automatically held to their open or released position, a means for each set of jaws for effecting a closing or clamping action thereof, a single lever-operated mechanism coöperatively joined with said independent brake-jaw devices for alternately controlling said devices to move them to a braking or non-braking position or for moving all of the jaw devices to a non-braking position in unison when desired.

In its more complete nature my invention consists in certain details of construction and novel combination of parts, all of which will hereinafter be fully explained, and specifically pointed out in the appended claims, reference being had to the accompanying drawings, in which—

Figure 1 is an end elevation of a transmission-gear mechanism including in its make-up a pair of brake-controlled drums with my improved arrangement of brake devices applied thereto. Fig. 2 is a perspective view of my improved brake mechanism detached.

In its preferred construction my invention includes a pair of brake mechanisms (designated by A A') disposed in parallel planes, and each consists of a pair of opposing clamping-bars B, whose opposing gripping-surfaces $b$ $b$ are concaved to conveniently engage the upper and lower surfaces of the drums J and I, as shown in Fig. 1. The bars B are pivotally supported on the fulcrum-pins $c$, mounted in the upper and lower end of the upright C, the lower ends of which terminate in angle-feet $c'$ for convenient attachment to the supporting means for the gear and the brake mechanisms. The rear ends of the bars B are normally contracted or drawn toward each other by the coil-springs G, the ends of which connect with the adjustable eyes $g'$ $g'$, mounted in the ends of the bars B, as shown.

At the forward end each brake-bar B has an adjustable eyebolt $b^2$ $b^2$, to each of which connects a toggle-link $b^3$ $b^3$, and the adjacent ends of the said links $b^3$ $b^3$ pivotally connect with the opposite ends $f'$ $f'$ of the cross-head $f$ of the T-lever F, the outer end of which carries a sleeve $f^2$, the reason for which will presently appear.

So far as described it will be readily apparent by referring to Fig. 2 of the drawings that when the lever F for the front one of the two sets of brake devices is at the position shown the toggle connection and the lever F will be at such adjustment as to draw the front ends of the brake-bars toward each other and against the tension of the spring G, and thereby hold the bars B firmly against the drum with which they engage, the toggle devices at the front end positively closing the front portion of the bars B B against the drum-surface, while the spring G at the rear end aids in holding the rear portion of the bars B B in firm gripping engagement with the drum. When the lever F for the rear set of bars B B (see Fig. 1) is in the position shown, then the said bars B B are fully separated and positively released from a braking position with the drum, and the said bars in either of the positions mentioned are so held by maintaining the levers F F to their shifted positions. To provide for conveniently manipulating the said levers F to effect the adjustments stated, I employ a rock-shaft D, suitably mounted in bearings $d$ $d$, and disposed transversely at a point forward of the front ends of the bars B B the said shaft D is provided with a pair of oppositely-projected cranks D' D', each of which pivotally joins with a rod E, the said rods having their upper ends bent, so as to properly coact with their respective crank members D' D', and they have their lower ends held to slide vertically in the sleeves $f^2$ and provided with adjustable stops $e'$ $e'$, as shown in the drawings. The said shaft D has an operating-handle at one end, (designated by $D^2$ in the drawings.) By arranging the cranks D' D' to project at diametrically opposite directions the lever $D^2$ requires a movement of a trifle more than that of the half-circle, as indicated, to complete the two movements of the brake-bars C, as before stated, as also the toggle devices joined therewith. It is obvious that by placing the cranks differently—that is, at less than one hundred and eighty degrees apart—the movement of the lever $D^2$, as well as that of the brake-bars B B, would be correspondingly less. By bending the upper ends of the rods E that join with the cranks D' permits the said cranks to readily pass the dead-center when in use, and thereby locks the brake mechanism to its adjusted position, so that the operator can remove his hand from the lever $D^2$ as desired. The sleeves $f^2$ on the outer ends of the levers F are axially rotatable on said levers to accommodate the change of vertical position of the rods E E, and the connection of the rods E with the levers F is such that on the down movement the said rods do not affect the position of their respective levers F and freely slip through the apertured sleeves or lugs $f^2$. This operation leaves the lever F at a central point and held there by the tension of the spring G and with the brake-bars B B separated at their greatest distance from the brake-drum. On the upthrust of the rods E their stops engage the sleeves $f^2$ and in consequence pulls the levers F up to the position shown at the front of Fig. 2, and thereby shifts the levers F, together with the links connected thereto, to pull the brake-bars B B together and into a braking engagement with the brake-drums, upon which the said bars B B are mounted. When desired, the shaft D may be rocked to such distance as to bring the levers F F to a midway position, and thereby hold each set of brake-bars B B from contact with their respective brake-drums.

Having thus described my invention, what I claim, and desire to secure by Letters Patent, is—

1. The combination in a braking mechanism as described, with the two sets of opposing clamping-bars B, a support in which the said bars are pivotally mounted, spring devices for normally forcing the bars apart, the links $b^3$, adjustably connected to the front end of the bars, the T-lever F pivotally connected with the adjacent ends of the links, and a hollow sleeve $f^2$, mounted on the outer end of each lever F; of the rock-shaft D having a handle $D^2$, and a pair of oppositely-projecting crank members D', the rods E pivotally connected to the ends of the cranks, slidably mounted in the tubular sleeves $f^2$, and having stop members $e'$, at their lower end, as specified.

2. The combination in a brake mechanism of the character described, with a support, a pair of opposing clamping-bars pivotally mounted on the said support, spring devices connected at one end to said bars for spreading the other ends thereof, a link $b^3$ pivotally connected to the outer end of each bar, a T-lever pivotally connected to the adjacent ends of the links, and an apertured sleeve axially mounted on the long arm of the lever F; of the rock-shaft D, provided with a crank D', and a handle, and the rod E, curved at its upper end, said end being pivotally connected with the crank member D', the lower end of said rod E having vertical movement in the sleeve $f^2$, and a stop $e'$ on the lower extremity of the rod E, all being arranged substantially as shown and described.

RALPH BENTON HAIN.

Witnesses:
CARROLL L. HARTMAN,
GRACE NICHOLSON.